United States Patent [19]

Landis

[11] Patent Number: 4,496,711

[45] Date of Patent: Jan. 29, 1985

[54] PROCESS FOR PREPARING ISOIMIDE CONTAINING OLIGOMERS

[75] Inventor: Abraham L. Landis, Northridge, Calif.

[73] Assignee: Hughes Aircraft Company, El Segundo, Calif.

[21] Appl. No.: 536,068

[22] Filed: Sep. 26, 1983

Related U.S. Application Data

[63] Continuation-in-part of Ser. No. 206,317, Jul. 24, 1981, Pat. No. 4,438,273.

[51] Int. Cl.$^3$ ............................................... C08G 73/10
[52] U.S. Cl. .................................... 528/125; 526/266; 528/26; 528/28; 528/126; 528/128; 528/172; 528/179; 528/182; 528/185; 528/188; 528/208; 528/351; 528/352; 528/353; 549/297; 549/298; 549/299; 549/300; 549/303; 549/320
[58] Field of Search ............... 528/172, 179, 182, 125, 528/126, 128, 185, 188, 208, 353, 351, 352, 26, 28; 526/266; 549/297–301, 303, 320

[56] References Cited

U.S. PATENT DOCUMENTS

| | | | |
|---|---|---|---|
| 3,261,811 | 7/1966 | Tatum | 524/600 |
| 3,271,366 | 9/1966 | Kreuz | 528/353 |
| 3,282,898 | 11/1966 | Angelo | 528/353 |
| 3,316,212 | 4/1967 | Angelo | 528/353 |
| 3,413,267 | 11/1968 | Kreuz | 528/353 |

Primary Examiner—Lester L. Lee
Attorney, Agent, or Firm—M. E. Lachman; A. W. Karambelas

[57] ABSTRACT

Processes for forming a class of relatively low molecular-weight oligomers containing at least one isoimide group and terminal groups capable of undergoing an addition polymerization reaction are provided. These oligomers are characterized by excellent solubility in common solvents and a melting temperature considerably lower than their cure temperature, thus enabling the oligomers to be formed into cured polymers more slowly and at lower temperatures, all without the evolution of deleterious gases. The process for forming these oligomers includes the formation of a polyamic acid and dehydration thereof under specified conditions to effect cyclization of the polyamic acid to form the isoimide-containing oligomer, without the formation of undesired side-reaction products.

32 Claims, No Drawings

PROCESS FOR PREPARING ISOIMIDE CONTAINING OLIGOMERS

RELATED APPLICATION

This application is a continuation-in-part of U.S. patent application Ser. No. 206,317, filed July 24, 1981, entitled "Isoimide Containing Oligomers", now U.S. Pat. No. 4,438,273.

BACKGROUND OF THE INVENTION

1. Field of the Invention

The present invention is directed to oligomers and in particular, to a class of relatively low-molecular weight oligomers which contain at least one isoimide group along with functional groups that enable the oligomers to be cured by addition polymerization. The invention is also directed to an improved process for producing such isoimide-containing oligomers essentially free of undesirable side reaction products.

2. Description of the Prior Art

Polymers formed of polyimides are well known in the art. One form of prior art polyimide polymer is described in U.S. Pat. No. 3,179,634, in which the polyimide polymers are characterized by repeating units having the formula:

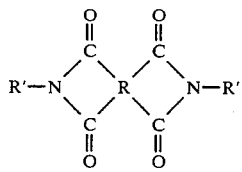

where R is a tetravalent aromatic group and R' is a divalent aryl group. Such polymers are known to be useful in the molding of films, fibers and the like having high tensile strength, good electrical properties and stability with respect to heat and water.

One of the primary drawbacks to polyimide polymers of the type described above arises from the method by which such polymers are prepared. Generally, the polymers are prepared by a condensation reaction in which a diamine is reacted with a dianhydride to form a corresponding polyamic acid. The polyamic acid can then be converted to the corresponding polyimide by heating. As those skilled in the art will appreciate, that condensation reaction is accompanied by the release of water vapor which can cause voids and other defects in molded products when liberated during a molding operation.

Substantial improvements over polyimide polymers of the type described in the above patent have been achieved as described in U.S. Pat. Nos. 3,864,309, 3,845,018, 3,879,349, and 3,928,450, the disclosures of which are incorporated herein by reference. As described in the foregoing patents, it has been discovered that the disadvantages of polyimide oligomers of the type described, and specifically the tendency of the liberated water vapor or other gaseous by-products to cause voids during molding, can be completely eliminated or substantially reduced when a polyimide oligomer is terminated with a terminal reactive group, such as an acetylenic group, capable of undergoing an addition polymerization reaction. As is described in the foregoing patents, acetylenic-terminated polyimide oligomers and other saturated polyimide oligomers can be polymerized, either with or without a catalyst, to form polymers which exhibit an extremely low void content along with high thermal stability characteristics and high structural strength.

While the polyimide oligomers containing acetylene groups described in the foregoing patents represent a significant advance in the art, they tend to have poor solubility in common lacquer solvents along with relatively high melting points, and their processibility to cured polyimides is difficult. Thus, at the high processing temperatures normally required, such polyimide oligomers cure too rapidly for use in many applications, particularly where the polymer is used to form a laminate over a large surface area.

U.S. Pat. No. 3,345,342 to Angelo, U.S. Pat. No. 3,261,811 to Tatum and U.S. Pat. No. 3,413,267 to Kruez disclose polyisoimides which can be used to form a polyimide by curing. Polyisoimides are prepared by reacting a carboxylic acid dianhydride with an aromatic diamine to produce a polyamic acid, and treating the resulting polyamic acid with a dehydrating agent. The polyisoimides of these patents are not disclosed as being oligomers but rather isoimide polymers and do not contain functional reactive end groups.

U.S. Pat. No. 4,097,456 to Barie and U.S. Pat. No. 4,133,792 to Antonoplos et al disclose improved processes for producing polyimide oligomers containing acetylene groups by carrying out the reaction in the presence of an N-methyl pyrrolidone solvent.

SUMMARY OF THE INVENTION

It has now been found that the foregoing disadvantages can be prevented or substantially minimized where at least some of the imide functional groups are replaced by a corresponding isoimide functional group. The presence of the isoimide group unexpectedly improves the solubility of such oligomers in common solvents, and, quite surprisingly, results in a substantial decrease in the melting point of the oligomers, as well as a significant increase in gel time. Thus, oligomers containing an isoimide group in accordance with the practice of this invention aid in their processibility. Further, these oligomers can be cured at a more controlled rate using a greater variety of common solvents to form cured polymers having essentially the same or improved properties and characteristics compared to those derived from the corresponding imide oligomer.

Such isoimide oligomers containing terminal functional groups, such as acetylene groups, can be prepared, for example, by reacting an aromatic dianhydride with an aromatic diamine, followed by reaction with an amino acetylene, under certain processing conditions. When prepared under suitable processing conditions, the resulting acetylene-substituted isoimide oligomers generally are free of side reaction products, such as anhydrides and imides. Upon curing such oligomers, as for example, by heating, the resulting cured oligomers do not have inferior properties of prior art products, particularly when thick parts or films are formed from the cured resin, which are characteristic of prior art oligomers wherein volatile impurities remain in the isoimide oligomer. In addition, the resulting cured products produced from the oligomers of the present invention do not tend to blister on post curing, since such oligomers are substantially free from volatile impurities.

It has been found that the reaction product of an aromatic dianhydride and an amine, and particularly followed by reaction with a mono-amine having functional groups to produce a polyamic acid, can then be converted to an isoimide oligomer upon cyclization. This is particularly true in the reaction of an aromatic dianhydride, an aromatic diamine and a mono-amine carrying functional groups, such as an amino aromatic acetylene, to produce the polyamic acid. Addition of a cyclizing agent under suitable reaction conditions produces cyclization of the polyamic acid to the isoimide oligomer.

In carrying out the reaction, according to a preferred embodiment, the aromatic dianhydride is first reacted with an aromatic diamine, followed by addition of an amino aromatic acetylene, to form the polyamic acid. The resulting polyamic acid is then reacted with a selected dehydrating agent e.g. trifluoroacetic anhydride or N,N'-dicyclohexylcarbodiimide, preferably at ambient temperature to effect cyclization of the polyamic acid to the isoimide substantially without formation of undesirable by-products.

The resulting acetylene-substituted isoimide prepolymer or oligomer product is essentially, or at least substantially, free of undesirable impurities and is then recovered. The resultant product can be heated and cured to form high quality finished cured molded parts or films.

The term oligomer as used shall refer to those polymeric precursors which contain reactive functional groups and are capable of undergoing self-polymerization, as for example, upon heating. Thus, the term oligomer shall include those compositions which have one or more units as hereinafter described, as long as they meet the above identified criteria.

According to the present invention, there is provided a polymerizable isoimide-containing oligomer prepared by:

(a) reacting a compound selected from the group consisting of:
(1) a carboxylic acid dianhydride having the formula

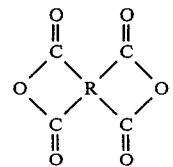

wherein R is a tetravalent organic group containing 2 to 27 carbon atoms, and (2) the reaction product of
(i) a carboxylic acid dianhydride having the above identified formula, and
(ii) a diamine having the formula $H_2N-R_5-NH_2$ wherein $R_5$ is a divalent organic group containing 2-30 carbon atoms; with a compound selected from the group consisting of:
(3) a functional amine having the formula $H_2N-R_1-X$ wherein $R_1$ is a divalent organic group containing 1 to 20 carbon atoms, and X is a functional group capable of undergoing addition polymerization; and
(4) a mono-anhydride having the formula

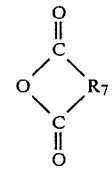

wherein $R_7$ is a trivalent aryl group having substituted thereon X as defined above, or a heterocyclic group, or a radical containing an alkenylene group, and (b) dehydrating the product under conditions to form an isoimide-containing oligomer.

It should be understood that either (1) the dianhydride, or (2) the reaction product of the dianhydride and a diamine (and not necessarily both) may be reacted with (3) the functional amine, or otherwise with (4) the monoanhydride (and not necessarily both the functional amine and monoanhydride). Thereafter dehydration of the product may take place.

The resulting isoimide oligomers thus produced will have one of the following formulae depending on the particular mode of reaction, as hereinafter described.

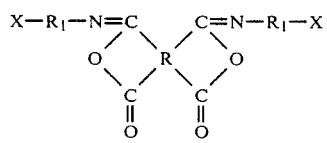

I

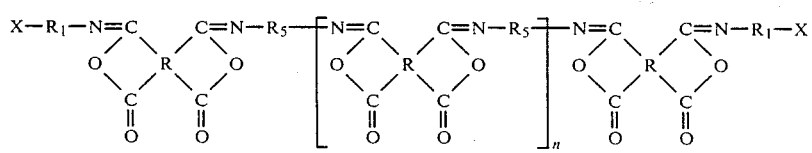

II

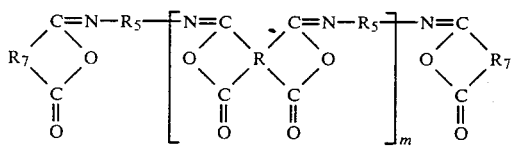

where n and m each denote the degree of polymerization and are described hereinafter.

The three generic forms of oligomers which may be produced in accordance with the present invention and which are disclosed herein are only representative of the oligomers which may be produced in accordance with the present invention. More particularly, at least three major processes and the oligomers produced thereby are included in the generalized formulae mentioned above and the three major processes and oligomers are set forth below.

One process for preparing an isoimide-containing oligomer and the oligomer produced thereby in accordance with the present invention comprises:

(a) reacting a carboxylic acid dianhydride having the formula:

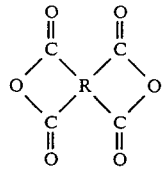

wherein R is a tetravalent organic group containing 2 to 27 carbon atoms, with a functional amine having the formula $H_2N-R_1-X$ wherein $R_1$ is a divalent organic group containing 1 to 20 carbon atoms, and (b) dehydrating the resulting product under conditions to form an isoimide-containing oligomer substantially free of side reaction products. The oligomer thus produced has the formula:

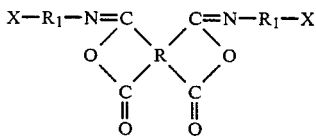

where R and $R_1$ are defined above, X is a functional group capable of undergoing addition polymerization, and n denotes the degree of polymerization and is 0 or 1 to about 30 and preferably 0 or 1 to about 15.

It should be understood that when reacting a dianhydride with a mono-amine, a simple diisoimide will result as shown in the structure formula I above. Thus, it is preferred in accordance with the present invention, to react the dianhydride with a diamine followed by reaction with a mono-amine, as hereinafter described in more detail.

III

In a second embodiment, and one of the more preferred embodiments, the process for preparing the isoimide-containing oligomer and the oligomer produced thereby in accordance with the present invention comprises:

(a) reacting a carboxylic dianhydride having the formula:

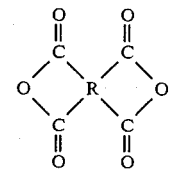

wherein R is a tetravalent organic group containing 2 to 27 carbon atoms with a diamine having the formula:

$$H_2N-R_5-NH_2$$

wherein $R_5$ is a divalent organic group containing 2 to 30 carbon atoms, (b) reacting the product of (a) with a functional amine having the formula:

$$H_2N-R_1-X$$

wherein $R_1$ is a divalent organic group containing 1 to 20 carbon atoms, and (c) dehydrating the resulting product under conditions to form an isoimide-containing oligomer essentially free of side reaction products.

The oligomer thus produced in this second embodiment has the formula:

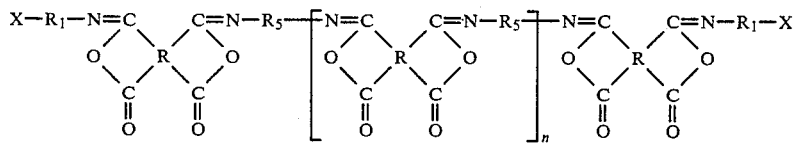

where R, $R_1$ and $R_5$ are defined above, X is a functional group capable of undergoing addition polymerization, and n denotes the degree of polymerization and is 0 or 1 to about 30 and preferably 0 or 1 to about 15.

In the third described embodiment, the process for preparing the isoimide-containing oligomer and the oligomer produced thereby in accordance with the present invention comprises:

(a) reacting a carboxylic dianhydride having the formula:

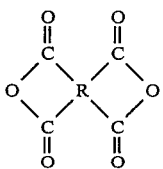

wherein R is a tetravalent organic group containing 2 to 27 carbon atoms with a diamine having the formula:

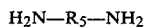

wherein $R_5$ is a divalent organic group containing 2 to 30 carbon atoms, (b) reacting the product of (a) with a monoanhydride having the formula:

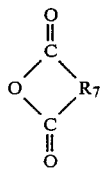

and (c) dehydrating the resulting product under conditions to form an isoimide-containing oligomer substantially free of side reaction products. The oligomers thus produced in this third embodiment have the formula:

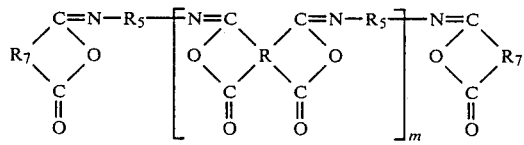

where R and $R_5$ are defined above, $R_7$ is a heterocyclic group or a radical containing an alkenylene group or a trivalent aryl group having substituted thereon a radical having an unsaturated functional group capable of undergoing addition polymerization with another radical having an unsaturated functional group, and m denotes the degree of polymerization and is 1 to about 30 and preferably 1 to about 15.

The cyclization or dehydrating agent is preferably selected from the group consisting of trifluoroacetic anhydride (TFAA) and N,N-dicyclohexylcarbodiimide (DCC) and dehydration preferably occurs at temperatures ranging from about 20 degrees C. to about 0 degrees C., under conditions to form an isoimide-containing oligomer substantially free, and more preferably, essentially free of side reaction products. Addition of the trifluoroacetic anhydride (TFAA), or particularly, N,N-dicyclohexylcarbodiimide, to a reaction mixture under suitable reaction conditions, produces cyclization of the polyamic acid to the acetylene-terminated isoimide oligomer. This results in a product which is essentially free of undesirable impurities or side reaction products, such as anhydrides and imides. The use of such trifluoroacetic anhydride or N,N'-dicyclohexylcarbodiimide also produces a product which has the highest amount of isoimide linkages in the polymeric backbone.

The oligomers produced in accordance with the present invention are highly effective in producing void-free composite structures having good solubility in common solvents. These oligomers are capable of producing void-free composite structures by addition polymerization. Such oligomers have relatively low melting points, and thus can be cured in a controlled manner.

This invention possesses many other advantages and has other purposes which may be made more clearly apparent from a consideration of the forms in which it may be embodied. These forms are described in detail in part of the present specification. They will now be described in detail for the purposes of more fully setting forth the general principles of the invention, but it is to be understood that such detailed descriptions are not to be taken in a limiting sense.

DETAILED DESCRIPTION OF PREFERRED EMBODIMENTS

The concepts of the present invention reside in a unique group of oligomers and unique processes for producing such oligomers. The oligomers of the invention contain at least one isoimide group along with at least one terminal group, and preferably two terminal groups, capable of undergoing addition polymerization. As noted above, the presence of the isoimide group results in a reduction of the melting point of the oligomer and an increase in the solubility of such oligomer in common solvents, as compared to oligomers prepared from the same reagents which contain imide functional groups, thus improving their processability.

In their simplest form, the oligomers of the present invention are prepared by a reaction of an organic carboxylic polyanhydride, particularly a dianhydride, and a mono-amine compound containing a functional group capable of undergoing addition polymerization reactions. Thus, the polyanhydride and the amine react to form a corresponding polyamic acid, which is then subjected to the action of a dehydrating agent. More particularly, the polyamic acid is subjected to the action of certain dehydrating agents and under certain specified reaction conditions, to convert the polyamic acid to an oligomer containing at least one isoimide group having the structure:

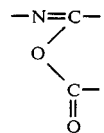

The following reaction, while not necessarily illustrative of producing an isoimide oligomer, as such, is representative of such a reaction which would take place to produce such oligomer. Using benzophenonetetracarboxylic dianhydride and 3-aminophenylacetylene, for example, the reaction achieved is in accordance with the following equation:

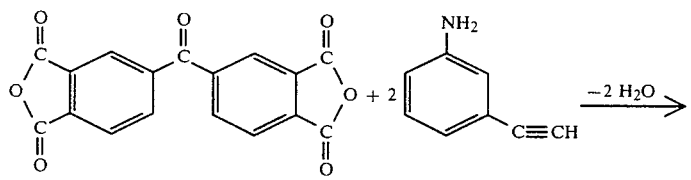

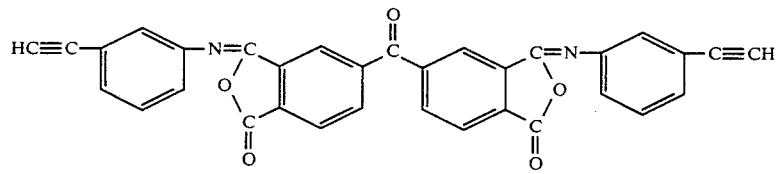

It should be understood by those skilled in the art, that it is not necessary that an isoimide group be formed in every position where an isoimide group could be formed. It is only required that the number of isoimide groups present in the oligomer be sufficient to reduce the melting point of the oligomer and increase its solubility in common solvents, as compared to the same oligomer without any isoimide groups, that is, the corresponding imide oligomer.

Oligomers of the foregoing type can thus be homopolymerized, either with or without the use of a catalyst, in accordance with the techniques described in U.S. Pat. Nos. 3,845,018 and 3,879,349. The greater solubility in common solvents and reduced melting point provide significant advantages in the processibility of the oligomer, enabling it to be cured more slowly in a controlled manner as compared to the corresponding oligomers prepared from the same reagents which contain only imide groups.

In accordance with another embodiment of the invention, use can be made of an aromatic polyamine for reaction with the polyanhydride either before reaction with the mono-amine or simultaneously therewith. In this embodiment of the invention, the polyamine serves to link together two or more anhydride groups, the resulting structure containing, as terminal groups, a mono-amine substituted with a functional group capable of undergoing addition polymerization.

Using benzophenonetetracarboxylic dianhydride and 3-aminophenylacetylene as well as 1,3-di-(3-aminophenoxy)benzene as illustrative, this latter concept may be illustrated by way of the following:

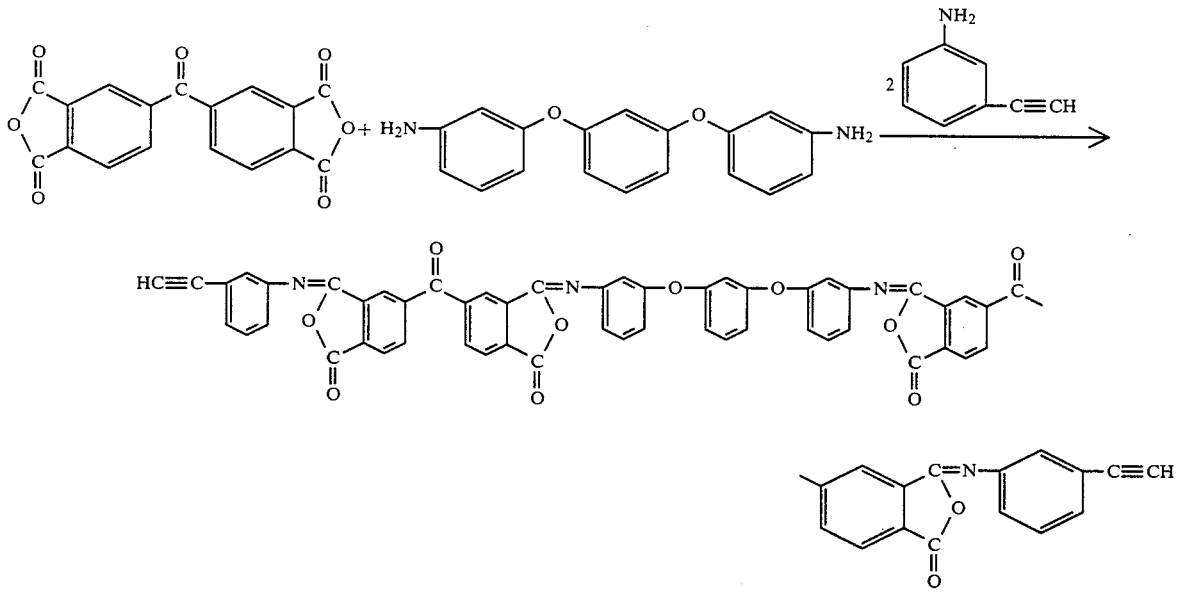

In the above product as structurally shown, all of the potential sites where either an isoimide or imide group could be formed have been shown in the isoimide form. In actual practice, however, the isoimide groups are formed along with imide groups and interspersed randomly throughout the structure of the oligomer. The important factor is that the isoimide groups are present in the oligomer in sufficient number to reduce the melting point of the oligomer and increase its solubility in common solvents. In general, it is sufficient that at least 30 percent of the positions which could be either isoimide or imide groups be isoimide groups.

In accordance with the preferred practice of the invention, a carboxylic acid dianhydride having the formula:

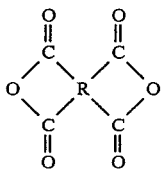

wherein, as noted above, R is a tetravalent organic group containing 2 to 27 carbon atoms, is reacted with a functional mono-amine having the formula $H_2N-R_1-X$ wherein $R_1$ is a divalent organic group containing 1 to 20 carbon atoms and X is a functional group capable of undergoing addition polymerization, to form the corresponding polyamic acid. More preferably, X is a radical having an unsaturated functional group capable of undergoing addition polymerization with another radical having an unsaturated functional group. The resulting polyamic acid is then dehydrated, preferably with a dehydrating agent, to form a corresponding isoimide and/or isoimide-imide containing oligomer.

The resulting oligomer can be one of two position isomers, either the cis isomer:

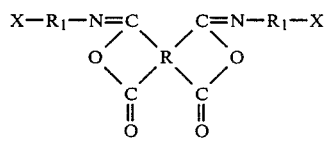

or the corresponding trans isomer:

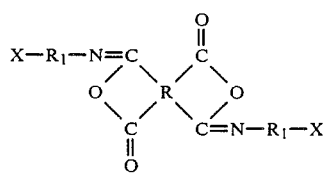

In actual practice, the oligomer is frequently a mixture of the above two isomers along with smaller amounts of oligomers containing an isoimide group and an imide group having the structure:

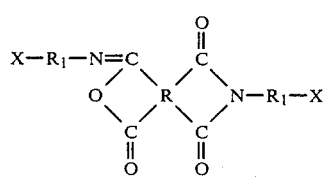

In addition, the reaction product may also contain small amounts of the corresponding di-imide.

The carboxylic acid dianhydride is one in which the R group is preferably a heterocyclic compound containing 5 to 18 carbon atoms, or an aryl group containing 6 to 18 carbon atoms. Representative of such groups are the following:

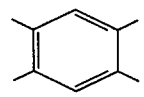

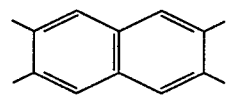

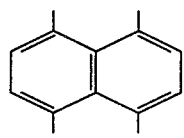

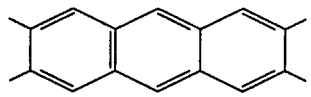

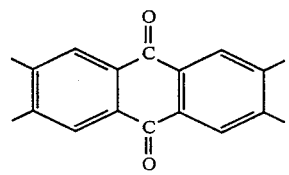

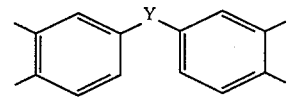

It should be understood that the valences in the above identified dianhydride structural formulae represent positions where anhydride moieties would be present. Thus, in the last of these structural formulae, the dianhydride would be represented by the structural formula

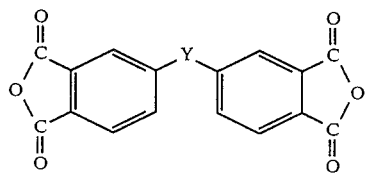

where Y is

$-(CH_2)_x-$, $-C(CH_3)_2-$, where x is an integer from 1 to 5, $-O-$, $-S-$, $-SO_2-$, $-(CF_2)_x-$, $-C(CF_3)_2-$ where x is as defined above, as well as the following groups:

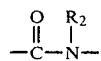

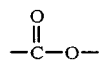

wherein $R_2$ and $R_3$ are aryl (such as phenyl, naphthyl, and substituted derivatives thereof) or alkyl containing 1 to 5 carbon atoms.

Such anhydrides are known to those skilled in the art and are described in U.S. Pat. Nos. 3,261,811 and 3,345,342, the disclosures of which are incorporated herein by reference. Typical of such anhydrides are:
pyromellitic dianhydride
3,4,3',4'-benzophenone tetracarboxylic dianhydride
2,3,6,7-naphthalene tetracarboxylic dianhydride
3,3',4,4,'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl) propane dianhydride
bis(3,4-dicarboxyphenyl) sulfone dianhydride
3,4,9,10-perylene tetracarboxylic dianhydride
bis(3,4-dicarboxyphenyl) ether dianhydride
2,6-dichloronaphthalene-1,4,5,8-tetracarboxylic dianhydride
1,1-bis(2,3-dicarboxyphenyl) ethane dianhydride
2,2-bis(3,4-dicarboxyphenyl) hexafluoroisopropylidene dianhydride
2,3-bis[4-(3,4-dicarboxyphenoxy)phenyl]hexafluoropropane dianhydride Other dianhydrides may also be used, including those containing heterocyclic rings, such as S-heterocycles, O-heterocycles, N-heterocycles and combinations thereof. For example, use can also be made of pyrazine-2,3,5,6-tetracarboxylic dianhydride or thiophene-2,3,4,5-tetracarboxylic dianhydride.

As the mono-amine is reacted with the dianhydride, use should be made of a mono-amine which is substituted with a functional group capable of undergoing addition polymerization reactions. Such functional groups are well known to those skilled in the art. In general, the functional group is one containing carbon-to-carbon unsaturation; it is also possible to employ, as the functional group, a cyano group which can be copolymerized by reaction with, for example, terephthalonitrile-N,N'-dioxides as described in U.S. Pat. No. 3,864,309, the disclosure of which is incorporated herein by reference.

It is preferred that the mono-amine have the formula $H_2N-R_1-X$ wherein $R_1$ is a divalent organic group containing 1 to 20 carbon atoms, including divalent arylene groups containing 6 to 20 carbon atoms, divalent alkyl groups containing 1 to 20 atoms, and heterocyclic groups containing 5 to 18 carbon atoms and X is a functional group capable of undergoing addition polymerization. More specifically, X is a radical having an unsaturated functional group capable of undergoing addition polymerization with another radical having an unsaturated functional group. X is preferably selected from the group consisting of $-C\equiv CH$, $-C=CH_2$, $-CN$ or the following group:

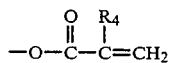

where $R_4$ is H or $-CH_3$.

Representative of suitable amines are allyl amine, propargyl amine, 3-aminophenyl acetylene, 3-(3-aminophenoxy)phenyl acetylene, 3-aminostyrene, 3-amino-4-bromostyrene, 3-aminobenzonitrile, 4-aminophenyl acrylate, 3-aminobenzyl methacrylate, 4-aminobenzylmethacrylate, etc.

In carrying out the reaction between the dianhydride and the mono-amine as described above, at least one mole of the mono-amine per mole of the dianhydride is employed. Preferably, the mono-amine is reacted with the dianhydride in a molar ratio ranging from about 1.2 to about 2.5 moles of mono-amine per mole of dianhydride, although it will be understood that greater amounts of mono-amine may be used.

In a preferred embodiment of the invention, an aromatic polyamine is reacted with the dianhydride, preferably prior to reaction with the mono-amine. The polyamine, and preferably a diamine, serves to link together two or more moles of the dianhydride, leaving terminal anhydride groups capable of reaction with the mono-amine. In general, use is made of at least one mole of the polyamine for each mole of the dianhydride and at least one mole of the mono-amine per mole of the dianhydride.

The diamine is preferably a compound having the formula:

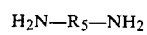

wherein $R_5$ is an alkylene containing 1 to 5 carbon atoms, a heterocyclic compound preferably containing from 5 to 18 carbon atoms, or a divalent aromatic group, preferably containing 6 to 30 carbon atoms. Preferred are arylene, arylene ether, and arylene thioether groups. Representatives of such groups include a phenylene group or a naphthylene group as well as a group having the formula:

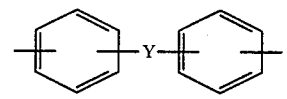

wherein Y is

$-(CH_2)_x-$, $-C(CH_3)_2-$ where x is an integer from 1 to 5, $-O-$, $-S-$, $-SO_2-$, $-(CF_2)_x-$, $-C(CF_3)_2-$ where x is as defined above, and the following groups:

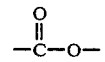

wherein $R_6$ and $R_{12}$ are aryl (such as phenyl and naphthyl, and substituted derivatives thereof), or heterocyclic, preferably containing 5 to 18 carbon atoms, or alkyl containing 1 to 5 carbon atoms.

In addition, $R_5$ can also be a group of the formula:

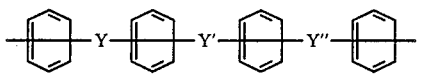

wherein Y, Y' and Y" are each the same or different and are selected from the same group as Y as defined above. As will be appreciated by those skilled in the art, the aryl groups set forth above as being part of the $R_5$ group can also be substituted with, for example, one or more halogen atoms, such as Cl or Br, lower alkyl groups and/or lower alkoxy groups, both of which can contain from 1 to about 5 carbon atoms.

Such diamines are well known to those skilled in the art and are described in detail in U.S. Pat. Nos. 3,261,811 and 3,345,342. Typical of such amines are:
- meta-phenylenediamine,
- 2,2-bis(4-aminophenyl) propane,
- 4,4'-diaminodiphenyl methane,
- 3,3'-diaminodiphenyl methane,
- 4,4'-diaminodiphenyl sulfide,
- 3,3'-diaminodiphenyl sulfide,
- 4,4'-diaminodiphenyl sulfone,
- 3,3'-diaminodiphenyl sulfone,
- 2,6-diaminopyridine,
- bis-(4-aminophenyl) diethylsilane,
- bis-(3-aminophenyl) ethyl phosphine oxide,
- 1,3-di(3-aminophenoxy) benzene
- 1,3-di(4-aminophenoxy) benzene
- 2,2-di(3-aminophenyl) hexafluoropropane
- 2,2-di(4-aminophenyl) hexafluoropropane
- 2,2-bis[4-(4-aminophenoxy)phenyl]hexafluoropropane Without limiting the invention to a theory, it is believed that the diamine reacts with the anhydride to form the corresponding polyamic acid having free acid anhydride groups available for reaction with the mono-amine. It is generally preferred that the carboxylic dianhydride be as pure as possible, and preferably free of the corresponding carboxylic acid. Without limiting the invention as to theory, it is believed that carboxylic acid impurities in the dianhydride result in the formation of amine salts which catalyze the conversion of isoimide groups to the corresponding imide groups. They can also be a source of volatile impurities which come out during the cure. After the reaction between the dianhydride and the diamine has been completed, it is generally preferable to introduce the mono-amine for reaction with those free terminal acid anhydride groups to form an oligomer end-blocked with the mono-amine. That reaction product is then subjected to dehydration to convert the polymic acid to the corresponding isoimide.

That overall reaction, again without limiting the present invention as to theory, may be illustrated diagrammatically as follows:

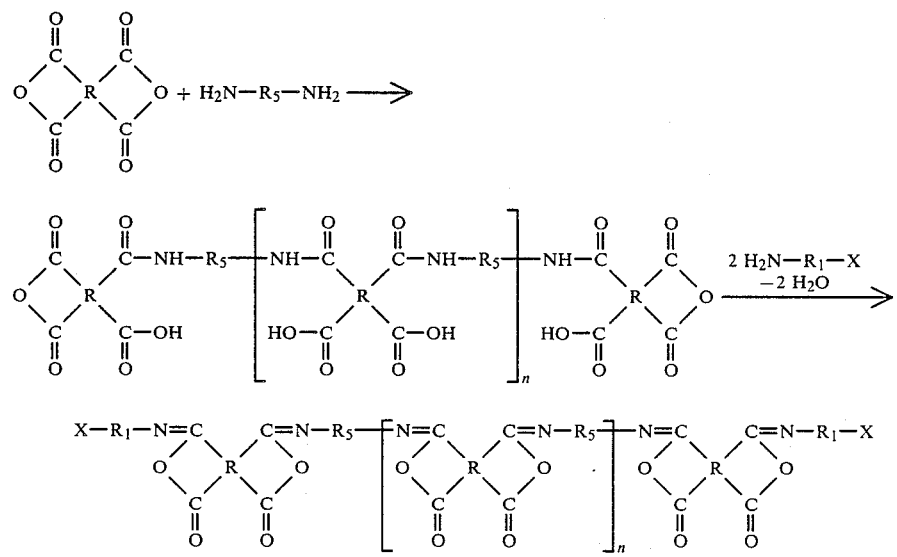

As shown in the preceding equation, the dianhydride reacts first with the diamine to form the corresponding polyamic acid, with the number of moles of diamine entering into the reaction depending on the proportion of the reactants. In the equation shown, n is an integer ranging from 0 or 1 to about 30, or higher, depending on the reactant proportions. As indicated, n preferably ranges from 1 to about 15. The variable is generally referred to as the degree of polymerization of the oligomer, commonly denoted DP.

As will be appreciated by those skilled in the art, the predominant degree of polymerization can be controlled by controlling the proportions of the reactants. Nonetheless, there is always a tendency for the reaction to form mixtures. For example, in the preparation of an oligomer of the type shown above having a DP of 1 (n=1), the reaction product contains predominantly a product in which the DP is 1, but also contains in decreasing proportion, oligomers in which the DP is 2, 3, 4 and so on.

In general, when it is desired to produce an oligomer having a DP of 1, the reactants are used in mole proportions so that for each mole of dianhydride, 0.67 mole of the diamine, and 0.6 mole of the monoamine are used. Similarly, when a DP 2 oligomer is desired, the molar proportions are about 0.75 mole of the diamine, and 0.50 mole of the mono-amine for each mole of the dianhydride. In like manner for a DP of 3, for each mole of dianhydride used, 0.80 mole of diamine is used and 0.40 mole of mono-amine is used.

In the overall reaction identified immediately above, for the specified degrees of polymerization the moles of the reactants are shown in the following table;

| n | dianhydride | diamine | monoamine |
|---|---|---|---|
| 0 | 2 | 1 | 2 |
| 1 | 3 | 2 | 2 |
| 2 | 4 | 3 | 2 |
| 3 | 5 | 4 | 2 |

Generally the dianhydride should be in excess and the total of the moles of diamine and mono-amine depends on the desired degree of polymerization. As the mole amount of diamine is increased, the degree of polymerization and molecular weight are also increased.

The above structure is, as those skilled in the art will appreciate, an idealized structure, depicting as it does all of the positions where an isoimide or imide group could be formed as isoimide groups. As noted above, such an idealized reaction product is difficult, if not impossible, to achieve because of the tendency to form imide groups along with isoimide groups. Of course, there is also the tendency of the reaction to produce both cis and trans isomers as well as mixtures thereof. However, the positions at which the isoimide groups form are not critical to the practice of the invention; the important feature is that the isoimide groups be present in a sufficient number so as to reduce the melting point of the resulting oligomer and increase its solubility in common lacquer solvents such as dialkyl ketones, tetrahydrofuran, etc. While the proportion of isoimide groups necessary to reach that result varies somewhat with the nature of the reactants used in preparing the oligomers, it has been found that at least 30 percent isoimide groups serve to decrease the melting point and increase the solubility of the resulting oligomers.

Preferred oligomers, in accordance with this embodiment, are prepared from a dianhydride such as 3,4-3',4'-benzophenonetetracarboxylic dianhydride, an aromatic diamine and an imino phenylacetylene monoamine.

In accordance with yet another embodiment of the present invention, it is also possible, and sometimes desirable, to employ reactants in which end-capping groups, containing a polymerizable functional group, also contain an anhydride group. In accordance with this embodiment of the invention, a dianhydride having the formula:

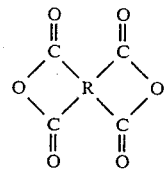

and a diamine having the formula:

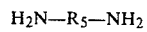

are reacted to form an amine-terminated polyamic acid which is then reacted with an anhydride having the formula:

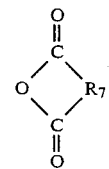

where R and $R_5$ are defined above and wherein $R_7$ is a heterocyclic group, or a radical containing an alkenylene group or a trivalent organic group, which is preferably an aryl group, having substituted thereon a functional group capable of undergoing addition polymerization reactions as described above.

The resulting product is then subjected to a dehydration reaction to convert at least some of the amic acid groups to isoimide groups. This concept, without limiting the invention as to theory, may be illustrated by the following chemical equation:

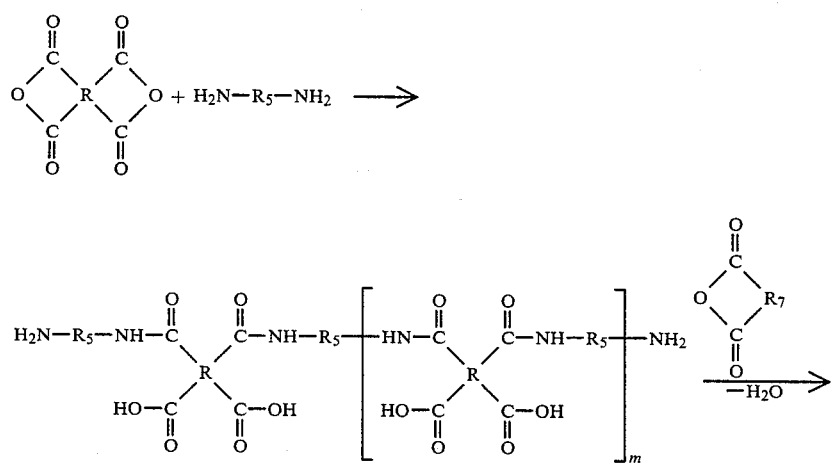

-continued

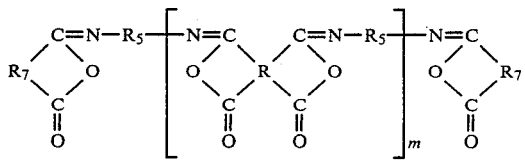

In the foregoing equation, m denotes the degree of polymerization, which can range from 1 to about 20 and preferably 1 to about 15, as aforesaid. As with the preceding equations, the products shown above are illustrated in an idealized form, with all of the sites where either imide or isoimide groups could be formed, taking the form of an isoimide group. In actual fact, again, some of these groups may be in the imide form.

As the functional anhydride, use can be made of a variety of mono-anhydrides, such as the following:
4-ethynyl-phthalic anhydride,
3-ethynyl-phthalic anhydride,
4-vinyl-phthalic anhydride
3-vinyl-phthalic anhydride
4-cyano-phthalic anhydride
3-cyano-phthalic anhydride
Maleic anhydride
Bicyclo[2,2,1]hept-2-ene-5,6-dicarboxylic anhydride The use of maleic anhydride produces an oligomer containing the following idealized structure:

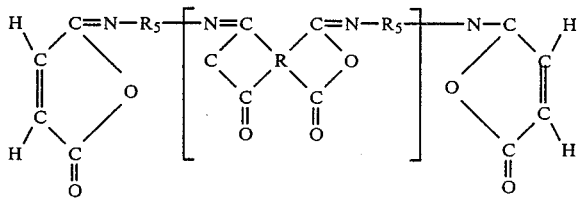

while the use of a bicycloheptene anhydride of the formula:

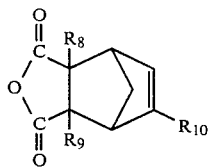

wherein $R_8$, $R_9$, $R_{10}$ are each H or lower alkyl, e.g. 1 to 5 carbon atoms, yields an idealized structure as follows:

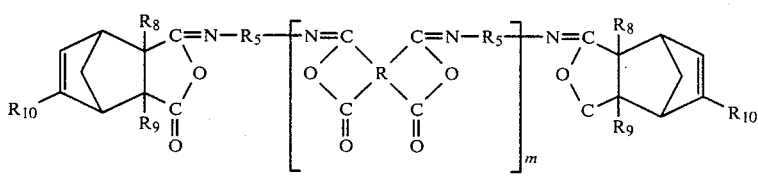

The reaction between (1) the carboxylic acid dianhydride and the functional mono-amine, or (2) the carboxylic acid dianhydride, aromatic polyamine and functional mono-amine, or (3) the carboxylic acid dianhydride, aromatic polyamine and a functional monoanhydride, is preferably carried out in the presence of a solvent. It has been found that tetrahydrofuran is a preferred solvent, although other solvents, such as dioxane, also can be employed. Tetrahydrofuran has a much lower freezing point as compared to dioxane, is less tenaciously held on by the oligomer, and is more miscible with the aliphatic solvents, particularly hexanes, used as a precipitating agent.

The temperature at which the reaction is carried out is not critical, and depends, to some degree, on the nature of the particular anhydrides being used and the particular amines being used. Best results are usually achieved when the reaction temperature is maintained below 100° C. Higher temperatures can cause the resulting polyamic acid to cyclize to the corresponding imide.

After the reaction has been completed, the product is in the form of a polyamic acid which can be converted to the corresponding isoimide oligomer through the use of a cyclization or dehydrating agent. Those dehydrating agents which are highly effective for use in the present invention constitute a class which permits the process to be operated at a relatively low temperature, at least as low as ambient temperature, when compared to prior art dehydrating agents.

In the broad aspect of the invention, the process for preparing the isoimide oligomers with unsaturated reactive terminal groups comprises the reacting of a dianhydride compound with an amine containing compound having unsaturated functional groups and preferably in an organic solvent. The solution is heated to form a polyamic acid. More specifically, the process, in one embodiment, involves the heating of a solution of the aromatic dianhydride and an aromatic diamine in an organic solvent. The process then involves the adding of an amino aromatic compound having unsaturated functional groups to the reaction mixture and heating the resultant reaction mixture to produce the corresponding polyamic acid.

After producing the polyamic acid, the reaction mixture is cooled to the reduced temperature about at least as low as the ambient temperature. The reduced temperature preferably is a temperature within a range of 0° C. to about 75° C. and more preferably 0° C. to about 20° C. It is quite preferable to carry out the dehydration reaction at a relatively low temperature, such as ambient temperature or below, e.g., the preferred range of 0° C. to about 20° C.

In order to cyclize the polyamic acid, the dehydrating agent is added to this reaction mixture under proper conditions to cause cyclization of the polyamic acid. The preferred group of dehydrating agents used in accordance with the present invention are characterized by having the following properties:

(1) The dehydrating agent is readily soluble with a polyamic acid in a common solvent.

(2) The dehydrating agent is capable of cyclizing a polyamic acid at the aforesaid reduced temperatures.

(3) The dehydrating agent does not substantially adversely affect the solubility of any of the reactants in the presence of the polyamic acid, and even more so, permits all of the necessary reactants to remain in the solution.

(4) The dehydrating agent is of a nature such that under the conditions of the reaction with the polyamic acid, such agent does not cause generation of a substantial amount of undesirable side-reaction products which cannot be readily removed and which might or which do adversely affect the isoimide oligomer thus produced.

(5) The dehydrating agent does not adversely affect the polyimide produced from the reaction mixture.

In a more preferred embodiment, the unsaturated functional groups on the amino aromatic compound are selected from the class consisting of vinyl groups, cyano groups, acetylenic groups, and ethylenic groups.

By carrying out the cyclization reaction at such relatively low temperatures, the isoimide oligomer product is essentially free of side-reaction products such as anhydrides and imides. In still another embodiment of the invention, the reaction mixture is reduced to substantially lower temperatures of about 0° C. to about 5° C. to cause reduction of further undesirable side reaction products. It has been found surprisingly and unexpectedly that if dehydration is carried out at a temperature above 5° C., e.g., 20° C., a further reduction to a temperature within the range of 0° C. to 5° C. and perhaps even lower temperatures for a relatively short time, e.g., a few minutes (5–10 minutes), will significantly reduce generation of undesirable side-reaction products.

The dehydrating agent preferred for use in the practice of the present invention is trifluoroacetic anhydride, and particularly N,N'-disubstituted carbodiimide, such as N,N'-dicyclohexyl carbodiimide (DCC) dissolved in tetrahydrofuran, and ketene.

In carrying out the reaction for producing preferred acetylene-substituted isoimides corresponding to structure II above according to the invention process, an aromatic dianhydride such as 3,4,3',4'-benzophenonetetracarboxylic dianhydride (BTDA) is first reacted with an aromatic diamine such as 1,3-di(3-aminophenoxy)benzene. These reactants are employed in a range of proportions of about 1.1 to about 2.2 moles of the dianhydride to 1 mole of the diamine, e.g., about 2 moles of the dianhydride to 1 mole of the diamine for a DP of about 1. The reaction mixture is heated, e.g. to a gentle reflux.

To the resulting reaction mixture there is added an aminoacetylene, preferably an amino aromatic acetylene, such as 3-aminophenylacetylene (APA). The aminoacetylene component is employed in an amount sufficient to react with the unreacted anhydride functional end groups. Generally about two moles of dehydrating agent is used with each mole of dianhydride to effectively convert all of the polyamic acid to isoimide. After the addition of the aminoacetylene component, the reaction mixture is heated, e.g. at a gentle reflux, for a period of about 15 minutes, to form the corresponding polyamic acid.

A solvent such as tetrahydrofuran is present in the reaction mixture during reaction of the dianhydride with the diamine, and during reaction of the resulting reaction mixture with the aminoacetylene component.

The organic solvent which is preferably used in accordance with the process of the present invention is selected to be reaction compatible with the dehydrating agent. In essence, the proper selection of the dehydrating agent and the solvent provide something approaching a process-synergistic effect. In other words, by the selection of the proper solvent, and the selection of the proper cyclization agent, in conjunction with the above low temperature reaction conditions, it is possible to produce the isoimide oligomer substantially free of the previously encountered side-reaction products. While the selection of the solvent and the cyclization agent may appear to be a simple matter, it has been found after proper experimentation that the cyclization agent and the solvent as described by their general properties herein are the only ones which can be used to truly obtain a wide processing window, that is, to permit formation of the isoimide oligomer substantially free of side reaction products and without the pressure and temperature and other chemical constraints previously encountered.

The solvent is characterized by the following properties:

(1) The solvent has a high solubility factor so that both the polyamic acid and the cyclizing agent are readily and quickly solubilized in the solvent.

(2) The solvent has a solubility factor so that the oligomer produced by the cyclization of the polyamic acid also readily solubilizes therein.

(3) The resultant isoimide is soluble in the solvent.

(4) The solvent has minimum reactivity with the oligomer thus formed thereby avoiding any degradation of the oligomer.

(5) The solvent has substantially no strong hydrogen bonding interaction with the oligomer thus formed and thus, does not adversely affect the formed oligomer.

(6) The solvent presents substantially no toxicity to the reactants or the oligomer thus formed.

(7) Any resultant by-products should preferably be insoluble in the solvent.

(8) The solvent should not cause reversion of the isoimide to the imide.

In addition to the above, the solvent preferably has a low boiling point, e.g., typically below 175° C. and preferably below 110° C., although this is not absolutely necessary.

The imides formed in accordance with prior art are usually soluble in strong aprotic solvents such as dimethyl acetamide (DMAC), dimethyl formamide (DMFM), dimethyl sulfoxide (DMSO) and N-methylpyrollidone (NMP). The imides, when cured, are generally insoluble and have low solubility in solvents such as ketones, cyclic ethers and alcohols.

It has been found in accordance with the present invention that many low boiling point solvents can be used and these include, for example, dioxane, tetrahydrofuran, various cyclic ethers, ketones, such as methyl ethyl ketone, acetone, isopropyl ketone and the like and mixtures of these ketones with toluene.

The reaction mixture containing the polyamic acid reaction product of the dianhydride, diamine and aminoacetylene components is then cooled, e.g. to ambient temperature. Trifluoroacetic anhydride, or more preferably N,N'-dicyclohexyl carbodiimide (DCC), is added while maintaining the temperature of the reaction mixture at ambient temperature. The trifluoroacetic anhydride or N,N'-dicyclohexyl carbodiimide is employed in a molar ratio of about 2.0 to about 2.3 per mole of acid dianhydride.

The reaction between the aromatic dianhydride, aromatic amine, and aminoacetylene components, produces the polyamic acid precursor of the acetylene-substituted isoimide oligomer. The trifluoroacetic anhydride or N,N'-dicyclohexyl carbodiimide functions as the cyclization or dehydrating agent for the polyamic acid and it has been found essential that the cyclization of the polyamic acid by the trifluoroacetic anhydride or N,N'-dicylohexyl carbodiimide be carried out at ambient temperature or below; or otherwise, the trifluoroacetic acid formed as a by-product will hydrolyze the isoimide product to regenerate the corresponding acid and the amide.

In preferred practice, N,N'-dicyclohexyl carbodiimide, dissolved in tetrahydrofuran is employed as the cyclization agent to form the isoimide oligomer.

The process of the present invention opens up the processing window for the resulting isoimides because of their enhanced solubility and lower melting point than the imide isomer. The isoimides produced in accordance with the process of the present invention have substantially longer gel times than those made in accordance with prior art processes for the isomeric imide form, as a result of the lower processing temperatures which can be used. Further, the wide process parameters enable the actual obtaining of polyimides from the isoimides when cured without compromising the excellent thermo-mechanical properties.

The above reaction can be followed, e.g. examined, using Fourier Transform Infra Red (FTIR) analysis by scanning for the appearance of the peaks characteristic of the anhydride (1856 cm$^{-1}$) and the amic acid (1545 cm$^{-1}$). Isoimide oligomers produced by the process of the invention are essentially free of these peaks. The isoimide is characterized by a peak at 1805 cm$^{-1}$ and 940 cm$^{-1}$. The use of the trifluoroacetic anhydride or N,N'-dicyclohexyl carbodiimide according to the invention is thus shown to produce an effective isoimide product.

The acetylene-substituted isoimide oligomers produced according to the invention process can have values of n (degree of polymerization), e.g. in formula (II) above, of 0, or 1 or higher, up to 15, depending upon the stoichiometry of the reacting monomers. The higher the value of n, the less the extent of crosslinking of the end product.

The oligomers of the present invention are used in the same manner as those described in U.S. Pat. Nos. 3,864,309, 3,845,018, 3,879,349 and 3,928,450 to produce cured resins having high strength and temperature characteristics as well as low void contents. Without limiting the present invention as to the theory, it is believed that the isoimide groups present in the oligomers of this invention are, when subjected to elevated temperature during cure, converted to the corresponding imide to thus form polyimide resins. Thus, the properties and physical characteristics of cured resins made from the oligomers of the present invention are virtually the same as those described in the foregoing patents.

In particular, the acetylene-terminated isoimide oligomers produced according to the invention process, as noted above, are essentially free from undesirable impurities or side reaction products which could affect the quality of the finally cured product or film produced from such oligomers, as by heating such oligomers at temperatures ranging from about 500° F. to about 700° F. The improved processibility of the oligomer also makes it possible to use conventional autoclave state-of-the art technology. Thus, by eliminating volatile impurities in the cured resin, it is possible to fabricate relatively thick parts, which, if they still contained volatile impurities, would tend to blister the part on post curing.

Having described the basic concepts of the present invention, reference is now made to the following examples, which are provided by way of illustration, and not by way of limitation, of the practice of the invention in making the oligomers and using them in the form of cured resins.

EXAMPLE 1

Benzophenonetetracarboxylic dianhydride (15.0 grams, 0.0466 mole) in 250 ml of tetrahydrofuran at 60°–65° C. was reacted with 3-aminophenylacetylene (10.9 grams, 0.0932 mole) for 1 hour. The solution was cooled and treated with trifluoroacetic anhydride (60 grams) maintaining the temperature at 10°–18° C. The reaction mixture was kept at 20°–25° C. for 18 hours and the bis-isoimide recovered by precipitation in hexane and then dried in a vacuum. The bis-isoimide was mostly isoimide (about 90 percent); the remainder was imide as determined by infrared spectroscopy. A yield of 17 grams was isolated, melting at 180°–190° C.

EXAMPLE 2

A three-necked one liter round bottom flask was fitted with a heating mantle, Tru-bore stirrer, reflux condenser, thermometer and addition funnel. The top of the reflux condenser was protected from atmospheric moisture with a drying tube.

The flask was charged with benzophenonetetracarboxylic dianhydride (30 grams, 0.0932 mole) and dry tetrahydrofuran (300 ml). The solution was heated to a gentle reflux and a solution of 1,3-di(3-aminophenoxy)-benzene (13.9 grams, 0.0476 mole) in dry tetrahydrofuran (125 ml) was added dropwise over a 30–40 minute period. Then, the reaction mixture was stirred for an additional 30 minutes and a solution of 3-aminophenylacetylene (10.9 grams, 0.0932 mole) in dry tetrahydrofuran (30 ml) added.

After the addition, the solution was heated at a gentle reflux for an additional 30 minutes, cooled to ambient temperature and trifluoroacetic anhydride (110 grams) was added dropwise, maintaining the temperature at ambient temperature by means of an ice bath. The reaction mixture was maintained at room temperature for approximately 18 hours. The oligomer was then precipitated by pouring the reaction mixture into 2300 ml of hexanes and the oligomer washed with fresh hexane.

The product was dried in a rotary film evaporator at 85° C. for several hours. The bright yellow oligomer, thus produced, weighed 52 grams. The oligomer product showed a characteristic infrared isoimide absorption at 1805 cm$^{-1}$ with only a very small amount of imide at 1780 cm$^{-1}$. The oligomer melts at 150°–155° C.

EXAMPLE 3

This example illustrates the preparation of an oligomer having a degree of polymerization of 1.

To a solution of benzophenonetetracarboxylic dianhydride (71.4 grams, 0.2217 mole) in dioxane (700 ml) at 70° C., a solution of 1,3-di)3-aminophenoxy)benzene (43.2 grams, 0.1478 mole) in dioxane (400 ml) was added dropwise over a one hour period. The solution was stirred for 30 minutes and 3-aminophenylacetylene (17.3 grams, 0.1478 mole) was added all at once. After stirring at 65-70 degrees C. for 2 hours, trifluoroacetic anhydride (275 grams) was added over a 15 minute period. The mixture was heated for an additional hour, cooled and the yellow oligomer (125 grams) was isolated by precipitation in hexane.

EXAMPLE 4

This example illustrates the preparation of an oligomer having a degree of polymerization of 9.

A three-necked, 1-liter, round-bottomed flask was fitted with a heating mantle, Tru-bore stirrer, thermometer, reflux condenser and addition funnel. The opening of the reflux condenser was protected with a Drierite filled tube. The flask was charged with benzophenonetetracarboxylic dianhydride (28.1 grams, 0.0873 mole) and dry tetrahydrofuran (300 ml). The mixture was heated to just below reflux and a solution of 1,3-di(3-aminophenoxy)benzene (23.2 grams, 0.0795 mole) in dry tetrahydrofuran (250 ml) was added dropwise over a 1-hour period. Then, a solution of 3-aminophenylacetylene (1.86 grams, 0.01585 mole) in a dry tetrahydrofuran (10 ml) was added. After the addition, the solution was heated at reflux for another hour, cooled at 10° C. and trifluoroacetic anhydride (120 grams) added dropwise with good stirring.

The reaction mixture was kept at ambient temperature for approximately 18 hours. The insoluble taffy-like product was triturated with approximately 125 ml of dry tetrahydrofuran to dissolve the product. This reaction mixture product was poured into 1 liter of hexanes which precipitated the oligomer. The rest of the reaction mixture was poured into 1 liter of hexanes and the precipitated product filtered, washed with hexane, and dried in a rotary film evaporator under vacuum at 80° C. The product weighed 49 grams.

Films cast from a dimethylformamide solution, and cured at 700° F. for one hour, yielded tensile strengths of 14,000 psi at room temperature and elongations of 3 percent.

EXAMPLE 5

To a solution of benzophenonetetracarboxylic dianhydride (48.3 grams, 0.150 mole) in tetrahydrofuran (500 ml) at 60°-65° C., a solution of 4,4'-oxydianiline (15.0 grams, 0.075 mole) in tetrahydrofuran (200 ml) was added dropwise over a 35 minute period. After the addition, the reaction mixture was heated at reflux for another 30 minutes and a solution of 3-aminophenylacetylene (17.6 grams, 0.1504 mole) in tetrahydrofuran (100 ml) was added. The mixture was then heated at reflux for 30 more minutes and cooled to about 5° to 10° C. Thereafter, trifluoroacetic anhydride (200 grams) was added and the mixture stirred for about 16-18 hours. The yellow product thus produced (60 grams) was isolated by precipitation in hexane.

Infrared spectroscopy showed that the product had the characteristic isoimide peak at 1805 cm$^{-1}$ and only a very small amount of imide at 1780 cm$^{-1}$. The product was soluble in acetone, tetrahydrofuran and a number of other solvents. It melted at 160°-165° C. and cured readily above its melting point. A Tg (glass transition temperature) of the cured resin greater than 400° C. was obtained for this product.

EXAMPLE 6

To a solution of 1,3-di(3-aminophenoxy)benzene (40.0 grams, 0.1370 mole) in tetrahydrofuran (300 ml) at 60°-65° C., a warm solution of benzophenonetetracarboxylic dianhydride (21.6 grams, 0.06708 mole) in tetrahydrofuran (525 ml) was added dropwise over a 45 minute period. After the addition, a solution of maleic anhydride (13.4 grams, 0.1370 mole) in tetrahydrofuran (100 ml) was added. The solution was then heated for 45 minutes more, cooled to 10° C. and trifluoroacetic anhydride (200 grams) was added dropwise. After stirring at 20°-25° C. for 18 hours the product (57 grams) was isolated by precipitation in hexane and vacuum drying. This oligomer product thus produced had appreciable solubility in a number of solvents, (acetone, tetrahydrofuran, glycolic ethers) and melted at 155°-160° C.

Each of the oligomers prepared in Examples 1-6 was compared to the corresponding oligomer which was in the imide form, as opposed to the isoimide form. In each case, the isoimide oligomers of this invention were soluble in ketones, alcohols, amides, glycol ethers and cycloaliphatic ethers (all of which are common lacquer solvents) whereas the corresponding imide oligomers were insoluble in such solvents, being soluble only in solvents such as N-methylpyrrolidinone and N,N-dimethylformamide.

In addition, the melting points, and in some cases, the gel times, of the various oligomers were compared. The results of these comparisons is set forth in the following table:

TABLE 1

| Form | Composition | Melting Point | Gel Time (Min) Temperature (°C.) |
|---|---|---|---|
| Isoimide | Example 1 | 180-190° C. | 0 |
| Imide form | | Intractable | |
| Isoimide | Example 2 | 145-150° C. | 15-30 (191° C.) |
| Imide form | | >200° C. | 3 (250° C.) |
| Isoimide | Example 3 | 150-155° C. | 15-30 (191° C.) |
| Imide form | | >200 ° C. | 3-5 (250° C.) |
| Isoimide | Example 4 | 160-165° C. | |
| Imide form | | >230° C. | |
| Isoimide | Example 5 | 155-160° C. | |
| Imide form | | >230° C. | |
| Isoimide | Example 6 | 150-160° C. | |
| Imide form | | — | |

In each instance, the isoimide form of the oligomer embodying the concepts of this invention had a melting point considerably lower than the corresponding imide form.

EXAMPLE 7

Using the procedure described in Example 2, approximately 1 mole of 3,3',4,4'-diphenyltetracarboxylic dianhydride is reacted with ½ mole of bis(4-aminophenyl)-dimethyl silane, and then the product of the reaction is reacted with 1 mole of 3-aminobenzonitrile.

The product is then dehydrated, and analyzed for infrared isoimide absorption. The resulting isoimide oligomer can be copolymerized with terephthalonitrile-N,N'-dioxide to form a copolymer in accordance with the teachings of U.S. Pat. No. 3,864,309.

EXAMPLE 8

This example illustrates the preparation of a bis-isoimide prepared from pyromellitic anhydride and 3-aminophenyl methacrylate.

Using the procedure illustrated in Example 1 set forth above, 1 mole of pyromellitic anhydride is reacted with 2 moles of 3-aminophenyl methacrylic acid. After the reaction is completed, the reaction mixture is cooled and dehydrated using ketene as a dehydrating agent.

Infrared absorption demonstrates the presence of isoimide groups.

EXAMPLE 9

This example illustrates the preparation of a bis-isoimide from allylamine and 2,3,6,7 naphthalenetetracarboxylic dianhydride.

Using the procedure described in Example 1, the above reactants are refluxed to form the corresponding polyamic acid, and then the reaction product is dehydrated with trifluoroacetic anhydride.

Infrared absorption of the bis-isoimide product indicates the presence of isoimide groups.

EXAMPLE 10

This example illustrates the preparation of a film from an acetylene-terminated isoimide having a degree of polymerization of 10 (from Example 4).

A 20 weight percent solids content of the oligomer in solvents such as methyl ethylketone, N,N-dimethylformamide, N,N-dimethylacetamide or N-methylpyrrolidinone is cast on a glass plate with a doctor blade to yield a 1 to 2 mil wet film. The plate with the film is prebaked at 150° F. for 1 hour and then cured stepwise at 400° F. for 15 minutes; 500° F. for 15 minutes, 600° F. for 15 minutes and finally at 700° F. for 1 hour in an air-circulating oven.

The film made in this way was found to have a tensile strength of 14,000 psi and an elongation of 3 percent. A Tg as determined using thermal mechanical analysis (often designated TMA) was found to be 230° C.

EXAMPLE 11

This example illustrates the preparation of a graphite fiber composite using standard-vacuum bag technology.

An acetylene-terminated isoimide (from Example 2) was dissolved in a 95:5 percent by volume mixture of methylethylketone:N-methylpyrrolidinone to a lacquer with a solids content of 25 percent by weight. The lacquer was brushed on unidirectional HTS-2 fibers wound on a 5 inch by 6 inch aluminum tool. The prepreg was air dried until the methylethyl ketone was evaporated. This was repeated until the wet resin content was brought up to about 40–45 percent.

The dried graphite prepreg was laid up into 8 ply construction in the following orientation: 0 degrees, 90 degrees, 90 degrees, 0 degrees, 0 degrees, 90 degrees, 90 degrees, 0 degrees. When required for additional tack, the prepreg was first coated with N-methylpyrrolidinone. The construction was placed into a vacuum oven with 2 plies of air weave and 1 ply of a Teflon coated Fiberglass used as a separator and placed on the outer prepreg surfaces and dried at 120° F. for 4 hours.

The prepreg was then taken out of the oven and rebagged as described above and placed into an autoclave. The initial pressure of the autoclave was 30 psi and 25 inches of mercury vacuum and the temperature was raised to 375° F. in 30 minutes. The, the pressure was increased to 150 psi with a 30 inch mercury vacuum and held for 2 hours. The part was cooled to 150° F. under air and vacuum pressure. The autoclave was then vented, the part removed and the formed part postcured in a standard air circulating oven. A dense non-porous laminate was obtained.

EXAMPLE 12

Using the procedure described in Example 1, one mole of pyromellitic anhydride in tetrahydrofuran is reacted with two moles of propargyl amine. The reaction mixture was cooled and then treated with a N,N'-dicyclohexylcarbodiimide (2.0 moles) in tetrahydrofuran while maintained at a temperature of about 20° C. The product is determined to be predominately a bis-isoimide having the formula:

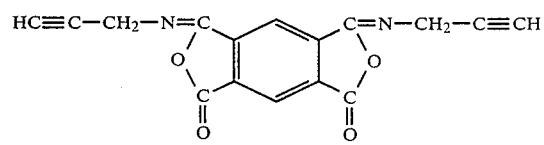

as well as the alternate position isomers thereof.

EXAMPLE 13

This example illustrates the preparation of a bis-isoimide prepared by reaction of 3,3',4,4'-diphenyltetracarboxylic dianhydride and 3-aminobenzonitrile.

Using the procedure illustrated in Example 1, one mole of dianhydride is reacted with two moles of 3-aminobenzonitrile. After reaction and subsequent dehydration with 2 moles of N,N'-dicyclohexylcarbodiimide, there is isolated from the reaction a bis-isoimide in the form of a mixture of the cis and trans isomers, the trans isomer having the formula:

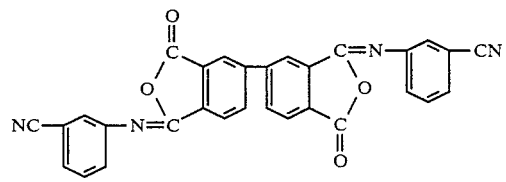

EXAMPLE 14

This example illustrates the preparation of a bis-isoimide from reaction of bis(3,4,-dicarboxylic phenyl)sulfone dianhydride with 3-(3-aminophenoxy) phenyl acetylene.

Using the procedure illustrated in Example 1, one mole of dianhydride is reacted with two moles of the mono-amine. After the reaction is completed, the product is dehydrated with trifluoroacetic anhydride to form a mixture of cis and trans isomers of an isoimide, the cis isomer having the following structure:

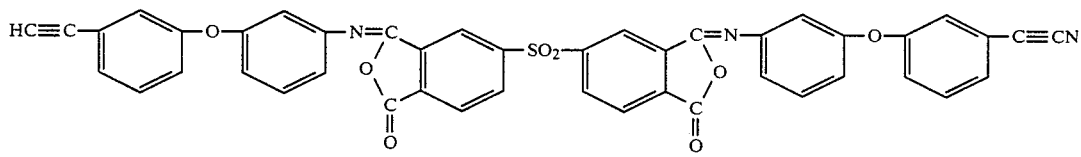

EXAMPLE 15

Using the procedure described in Example 2, two moles of 2,2-bis(3,4-dicarboxyphenyl) propane dianhydride are reacted with 1 mole of 1,3-di(3-aminophenoxy)benzene, and then the product of the reaction is reacted with 2 moles of 3-aminobenzonitrile. After the polyamic acid is formed, the product of the reaction is dehydrated with trifluoroacetic anhydride to form an isoimide-containing oligomer.

EXAMPLE 16

Using the procedure described in Example 2, two moles of pyromellitic anhydride are reacted with one mole of oxydianiline, and then two moles of 3-aminophenyl acetylene are added to the reaction. The reaction mixture is then cooled and dehydrated with trifluoroacetic anhydride to form the corresponding isoimide-containing oligomer. It has been determined that yield of isoimide groups, to the exclusion of imide groups, is increased when the pyromellitic dianhydride is purified to remove all carboxylic acid-containing impurities.

EXAMPLE 17

Using the procedure described in Example 2, two moles of 2,2-bis(3,4,-dicarboxyphenyl) hexafluoroisopropylidine dianhydride are reacted with one mole of 2,6-diaminopyridine. The product is then reacted with 3-(3-aminophenoxy) phenyl acetylene. The reaction mixture is cooled and dehydrated with N,N'-dicyclohexylcarbodiimide to form the corresponding isoimide-containing oligomer.

EXAMPLE 18

This example illustrates the preparation of an isoimide-containing oligomer silimiar to the oligomer of Example 1 but containing very little imide isomer.

A 1-liter, three-necked round bottom flask fitted with a Tru-bore stirrer, thermometer and dropping funnel was charged with carboxylic acid free benzophenonetetracarboxylic dianhydride (45 grams, 0.1398 mole) and dry tetrahydrofuran (400 ml). To the slurry, at 27° C. (ambient), a solution of 1,3-di(3-aminophenoxy) benzene (20.40 grams, 0.06988 mole) in dry tetrahydrofuran (200 ml) was added dropwise with good stirring. Shortly after starting the addition, all the solids went into solution. Then, to the light amber, clear solution, a solution of 3-aminophenylacetylene (16.35 grams, 0.1398 mole) in dry tetrahydrofuran (100 ml) was added.

The solution was allowed to stand at ambient temperature for approximately 16 hours and then cooled to −10° C. Trifluoroacetic anhydride (68.5 grams, 0.326 mole) was added dropwise carefully maintaining the temperature below 0° C. The addition took approximately 10 minutes. After the addition, the solution was allowed to stand for 105 minutes and the oligomer precipitated by pouring the solution into a large quantity of hexane (4 liters). The oligomer was filtered and washed with fresh hexane and dried under vacuum, starting first at ambient temperature and finally increasing the temperature to 90° C.

The oligomer (72 grams) was mostly isoimide as evidenced by the presence of the 1805 cm$^{-1}$ peak in an infrared spectrogram and no peak at 1780 cm$^{-1}$ (imide).

EXAMPLE 19

This example illustrates preparation of an isoimide-containing oligomer employing, N,N'-dicyclohexylcarbodiimide as a dehydrating agent.

A 5-liter, three-necked round-bottom flask is fitted with a thermometer and a moisture protected reflux condenser. The flask is charged with the best grade available of benzophenonetetracarboxylic dianhydride (272 grams, 0.8447 mole) and dry tetrahydrofuran (1200 ml). The slurry is warmed to approximately 40°–45° C. and a solution of 1,3-bis(3-aminophenoxy)benzene (123.3 grams, 0.4224 mole) in dry tetrahydrofuran (400 ml) is added dropwise over a 25 minute period with good stirring. The temperature is maintained in the 40°–45° C. range. Most of the benzophenonetetracarboxylic dianhydride is in solution by the end of the addition. Then, 3-aminophenylacetylene (98.8 grams, 0.8447 mole) in dry tetrahydrofuran (200 ml) is added in 15 minutes, maintaining the temperature at 40°–45° C. At the end of the addition all of the reactants are in solution.

The reaction mixture is stirred for approximately 30 minutes at ambient temperature and is then cooled to 0°–5° C. A solution of N,N'-dicyclohexylcarbodiimide (354.9 grams, 1.1706 moles, 99%+grade) in dry tetrahydrofuran (400 ml) is added dropwise maintaining the temperature at 0°–5° C. During this addition, N,N'-dicyclohexylurea is precipitated at a by-product. The solution is stirred at ambient temperature for approximately sixteen hours, cooled to 0° C. to maximize the amount of N,N'-dicyclohexylurea which can be removed from the reaction mixture. The reaction mixture is filtered and the filtrate is divided into two equal parts. The first part is used to precipitate the oligomer with hexanes, and the second part is used to precipitate the oligomer by dry isopropyl alcohol. Thus, 1 part by volume of the filtered reaction mixture is added to rapidly stirred solvent (four parts by volume) of either hexanes or isopropyl alcohol. The oligomer is filtered, dried in vacuum at room temperature and the temperature slowly raised to 70° C. over a twenty-four hour period.

A more quantitive precipitation is effected by the hexane but the oligomer is more difficult to dry. The isopropyl alcohol precipitation results in approximately 86 percent recovery. However, the oligomer is dried to about 1.5 percent volatiles compared to approximately 4 percent for the hexane precipitation by the above drying process.

EXAMPLE 20

A 2-liter, three necked flask is fitted with a Tru-bore stirrer, pressure equalization dropping funnel and a Claisen adapter fitted with a thermometer and a drying tube. The flask is charged with powdered pyromellitic dianhydride (50.5 grams, 0.2317 mole) and tetrahydrofuran (400 ml). To the briskly stirred mixture, a solution of 2,2-bis[4-(4-aminophenoxy)phenyl]hexafluoropropane (60.6 gram, 0.1158 mole, 4-BDAF) in tetrahydrofuran (300 ml) is added dropwise over a 45 minute period. The temperature is maintained in the 30°–35° C. range. Then 3-aminophenylacetylene (27.1 grams, 0.2317 mole) in tetrahydrofuran (100 ml) is added. The solution is stirred for 30 minutes, cooled to 0° C. and a solution of N,N'-diclohexylcarbodiimide (95.5 grams, 0.4636 mole) in tetrahydrofuran (200 ml) is added maintaining the temperature at 0°–5° C. during the addition. The reaction mixture is stirred for 24 hours at ambient temperature and filtered to remove the N,N'-dicyclohexylurea by-product.

The oligomer is isolated by adding the filtrate to four times its volume of isopropyl alcohol. The oligomer is vacuum dried first at room temperature and finally at 80°–85° C. The yellow oligomer melts at 168° C. and is extremely soluble in tetrahydrofuran. The imide isomer does not show any melting even when heated up to 320° C.

EXAMPLE 21

To 2 moles of benzophenonetetracarboxylic dianhydride in tetrahydrofuran, a solution of 1 mole of 2,2-bis[4-(4-aminophenoxy)phenyl]hexafluoropropane in tetrahydrofuran is added. Then a solution of 2 moles of 3-aminophenyl acetylene in tetrahydrofuran is added. The solution is cooled to 0°–5° C. and 4 moles of N,N'-dicyclohexyl carbodiimide in tetrahydrofuran is added. The insoluble N,N'-dicyclohexylurea is filtered off and the oligomer isolated by pouring the filtrate into approximately four times its volume of isopropyl alcohol. The dried yellow oligomer melts at approximately 140°–150° C.

Thus, there has been described novel isoimide oligomers and methods for preparing same in which the resultant isoimide oligomer has excellent solubility in common solvents and melting temperatures considerably lower than cure temperatures. The oligomers and the method of preparing same thereby fulfill all of the objects and advantages sought therefor. It should be understood that many changes, modifications, variations and other uses and applications will become apparent to those skilled in the art after considering this specification. Therefore, any and all such changes, modifications, variations and other uses and applications which become apparent to those skilled in the art after considering this specification are deemed to be covered by the present invention.

What is claimed is:

1. A process for preparing an isoimide-containing oligomer which comprises:
    (a) reacting in a first chosen organic solvent with the addition of heat
        (1) the reaction product of
            (i) a carboxylic acid dianhydride having the formula,

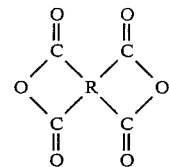

wherein R is a tetravalent organic group containing 2 to 27 carbon atoms, and (ii) a diamine having the formula $H_2N—R_5—NH_2$ wherein $R_5$ is a divalent aryl group containing 2 to 30 carbon atoms; with a compound to enable formation of a polyamic acid and which compound is selected from the group consisting of:

(2) a functional amine having the formula $H_2N—R_1—X$ wherein $R_1$ is a divalent organic group containing 1 to 20 carbon atoms, and (3) a monoanhydride having the formula

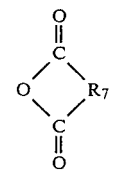

wherein $R_7$ is a trivalent aryl group having substituted thereon X, a radical containing an alkenylene group, or a heterocyclic group, and X in (2) and (3) is a radical having an unsaturated functional group capable of undergoing addition polymerization with another radical having an unsaturated functional group;

(b) cooling the resulting first reaction mixture to a selected temperature about at least as low as ambient temperature, (c) adding to said first reaction mixture at said selected temperature a dehydrating agent to cyclize said polyamic acid by dehydration to thereby form an isoimide-containing oligomer in solution in a second reaction mixture, and which dehydrating agent has the following properties of (1) being readily soluble with a polyamic acid in a common solvent, (2) cyclizing a polyamic acid at reduced temperatures at least as low as ambient temperature, (3) not substantially adversely affecting solubility of any reactants in the presence of the polyamic acid and permitting all of the necessary reactants to remain in solution, (4) not causing generation of a substantial amount of undesirable side-reaction products which are not readily removable and which might or do adversely affect the isoimide oligomer thus produced, and (5) not substantially adversely affecting a polyimide produced therefrom, (d) mixing the solution of said second reaction mixture with a second selected solvent to produce precipitation of said isoimide-containing oligomer as a solid product; and (e) separating said solid product from said second selected solvent.

2. The process of claim 1 wherein the unsaturated functional groups on the amine containing compound are vinyl groups, cyano groups, acetylenic groups, and ethylenic groups.

3. The process of claim 1 wherein the reaction mixture is further reduced to a temperature within a range of 0° C. to about 5° C. to cause reduction of further undesirable side-reaction products.

4. The process of claim 1, wherein said dehydrating agent is selected from the group consisting of trifluoroacetic anhydride and N,N-dicyclohexylcarbodiimide and said selected temperature is within the range of about 0° C. to about 20° C.

5. The process of claim 1 wherein said first chosen organic solvent is selected so that it has the following properties of (1) having a low boiling temperature of at least below 120° C., (2) having a high solubility factor so that both the polyamic acid and the cyclizing agent are readily and quickly solubilized in the solvent, (3) having a solubility characteristic so that the oligomer produced by the cyclization of the polyamic acid is also readily soluble therein, (4) having minimum reactivity with the oligomer thus formed, (5) being sufficiently insoluble to any undesirable by-products which may be formed, (6) having substantially no strong hydrogen bond interaction with the oligomer thus formed, (7) presenting substantially no toxicity to the reactants or the oligomer thus formed, and (8) and not causing reversion of isoimide to imide.

6. The process as defined in claim 1 wherein the dianhydride is benzophenonetetracarboxylic dianhydride.

7. The process as defined in claim 1 wherein the functional amine is 3-aminophenyl acetylene.

8. The process as defined in claim 1 wherein the dehydrating agent is N,N-dicyclohexylcarbodiimide.

9. The process as defined in claim 1 wherein the diamine is 1,3-di-(3-aminophenoxy) benzene.

10. The process as defined in claim 1 wherein the diamine is 4,4'-oxydianiline.

11. The process as defined in claim 1 wherein X is a vinyl, acetylene or cyano group.

12. The process defined in claim 1, wherein the dianhydride has the formula:

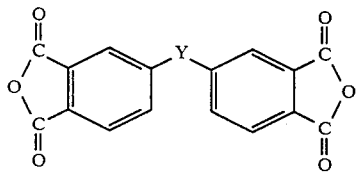

wherein Y is selected from the group consisting of

—(CH$_2$)$_x$, —C(CH$_3$)$_2$—, —O—, —S—, —SO$_2$—, —C(CF$_3$)$_2$—, —(CF$_2$)$_x$— wherein x is an integer from 1 to 5, and a group having the formula:

-continued

wherein R$_2$ and R$_3$ are each selected from the group consisting of aryl and alkyl.

13. The process as defined in claim 1 wherein X is selected from the group consisting of a group of the formula:

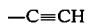

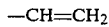

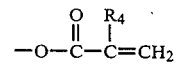

wherein R$_4$ is H or —CH$_3$, and —CN.

14. The process as defined in claim 1 wherein the monoanhydride is maleic anhydride.

15. The process as defined in claim 1 wherein the monoanhydride has the formula:

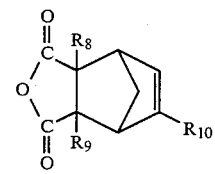

wherein R$_8$, R$_9$ and R$_{10}$ are the same or different and are each selected from the group consisting of H or lower alkyl.

16. A process for preparing acetylene-terminated isoimide oligomers essentially free of impurities which comprises:
 (a) reacting an aromatic dianhydride, an aromatic diamine and an amino aromatic acetylene in a first chosen solvent to produce a polyamic acid,
 (b) reacting said polyamic acid with a cyclization agent selected from the group consisting of trifluoroacetic anhydride and N,N-dicylohexylcarbodiimide at a temperature at least as low as ambient temperature to cause cyclization of said polyamic acid and produce a reaction mixture containing said acetylene-terminated isoimide oligomer in solution and essentially free of said impurities,
 (c) mixing the solution of said reaction mixture with a second solvent to produce precipitation of said isoimide oligomer as a solid product; and
 (d) separating said solid product from said second solvent.

17. The process as defined in claim 16, said first solvent being selected from the class consisting of tetrahydrofuran and dioxane.

18. The process as defined in claim 16, said temperature ranging from about 20° C. to about 0° C.

19. The process as defined in claim 16, wherein said second solvent comprises a hexane compound.

20. The process as defined in claim 16, said reaction between said aromatic dianhydride, said aromatic diamine and said amino aromatic acetylene taking place at approximately reflux temperature.

21. A process for preparing acetylene-terminated isoimide oligomers essentially free of impurities which comprises the steps of:
(a) heating a solution of an aromatic dianhydride and an aromatic diamine in a first chosen organic solvent to produce a first reaction mixture,
(b) adding an amino aromatic acetylene to said first reaction mixture and heating the resulting second reaction mixture to produce the corresponding polyamic acid,
(c) cooling said second reaction mixture to a selected temperature at least as low as ambient temperature,
(d) adding a dehydrating agent selected from the group consisting of trifluoroacetic anhydride and N,N-dicyclohexylcarbodiimide to said second reaction mixture at said selected temperature to cause cyclization of said polyamic acid and to produce a third reaction mixture containing said acetylene-terminated isoimide oligomer in solution, without formation of side-reaction products,
(e) mixing with the solution of said third reaction mixture a second solvent to produce precipitation of said oligomer as a solid product, and
(f) separating said solid product from said second solvent.

22. The process as defined in claim 21, said heating in steps (a) and (b) taking place at about reflux temperature, and the reaction with said dehydrating agent in step (d) taking place at between about 20° C. and 0° C.

23. The process as defined in claim 21, said first chosen solvent being selected from the class consisting of tetrahydrofuran and dioxane.

24. The process as defined in claim 21, wherein said second solvent is selected from the class consisting of isopropyl alcohol and hexane.

25. The process as defined in claim 21, said aromatic dianhydride being a benzophenonetetracarboxylic dianhydride, said aromatic diamine being di(aminophenoxy)benzene and said amino aromatic acetylene being an aminophenylacetylene.

26. The process as defined in claim 21, said aromatic dianhydride being employed in a proportion ranging from about 1.1 to about 2.5 moles and said amino aromatic acetylene in a proportion ranging from about 2.2 to about 0.12 moles, per mole of said aromatic diamine, and said dehydrating agent in a proportion from about 2.0 to about 2.3 moles, per mole of aromatic dianhydride.

27. The process as defined in claim 21, said aromatic dianhydride being pyromellitic dianhydride, said aromatic diamine being 2,2-bis[4-aminophenoxy)phenyl]-hexafluoropropane and said aromatic acetylene being an aminophenyl acetylene.

28. The process as defined in claim 21, said aromatic dianhydride being a benzophenonetetracarboxylic dianhydride, said aromatic diamine being 2,2-bis[4-(4-aminophenoxy)phenyl]-hexafluoropropane and said aromatic acetylene being an aminophenylacetylene.

29. A process for preparing acetylene-terminated isoimide oligomers essentially free of impurities which comprises the steps of:
(a) heating a solution of benzophenonetetracarboxylic dianhydride and a first solvent selected from the class consisting of (1) di(aminophenoxy)benzene in tetrahydrofuran, (2) tetrahydrofuran, and (3) dioxane, under reflux to produce a first reaction mixture,
(b) adding an aminophenylacetylene to said first reaction mixture and heating the resulting second reaction mixture under reflux to produce the corresponding polyamic acid,
(c) cooling said second reaction mixture to a selected temperature within the range of about 0° C. to about 20° C.,
(d) adding a dehydrating agent selected from the group consisting of trifluoroacetic anhydride and N,N-dicyclohexylcarbodiimide to said second reaction mixture at said selected temperature to cause cyclization of said polyamic acid and to produce a third reaction mixture containing said acetylene-terminated oligomer,
(e) filtering said third reaction mixture to remove any side-reaction products which are insoluble in said first solvent, to thereby form a filtrate containing said isoimide oligomer,
(f) pouring said filtrate into a second precipitating solvent selected from (1) a mixture of hexanes and (2) isopropyl alcohol, and precipitating said oligomer,
(g) separating said oligomer from said precipitating solvent,
(h) washing said oligomer with a third solvent, and
(i) drying said oligomer to recover an isoimide oligomer product essentially free of impurities.

30. The process as defined in claim 29, said benzophenone tetracarboxylic dianhydride being 3,3',4,4'-benzophenonetetracarboxylic dianhydride, said di(aminophenoxy)-benzene being 1,3-di(3-aminophenoxy)-benzene, and said aminophenylacetylene being 3-aminophenylacetylene.

31. The process as defined in claim 30, said dehydrating agent being N,N-dicyclohexylcarbodiimide.

32. The process as defined in claim 1 said first solvent being selected from the class consisting of tetrahydrofuran and dioxane.

* * * * *